United States Patent [19]

Häussermann

[11] 4,139,038
[45] Feb. 13, 1979

[54] DEVICE FOR SAFEGUARDING SCREW CONNECTIONS AND OTHER MOVABLE PARTS AGAINST ACCIDENTAL LOOSENING

[75] Inventor: Ingo Häussermann, Stuttgart, Fed. Rep. of Germany

[73] Assignee: Häussermann Lamellen Dr.-Ing. Kurt Häussermann, Esslingen-Mettingen, Fed. Rep. of Germany

[21] Appl. No.: 774,815

[22] Filed: Mar. 7, 1977

[51] Int. Cl.² ............................................. F16B 39/14
[52] U.S. Cl. ........................................ 151/30; 85/36
[58] Field of Search ............... 151/30, 15, 3; 85/32 V, 85/36, 8.8

[56] References Cited

U.S. PATENT DOCUMENTS

| 1,059,420 | 4/1913 | Worth .................... 151/3 X |
| 1,697,602 | 1/1929 | Kulka ..................... 151/30 |
| 1,920,792 | 8/1933 | Hotchkin ............... 151/30 X |
| 2,270,807 | 1/1942 | Johnson ................ 151/30 X |
| 2,378,684 | 6/1945 | Carlstrom ............. 151/30 X |
| 2,407,830 | 9/1946 | Griffin ................. 85/32 V X |
| 2,494,882 | 1/1950 | Kost ....................... 85/36 X |
| 2,577,319 | 12/1951 | Feitl ......................... 85/36 |
| 2,712,262 | 7/1955 | Knohl ...................... 85/36 |

*Primary Examiner*—Ramon S. Britts
*Attorney, Agent, or Firm*—Walter Becker

[57] ABSTRACT

A device for safeguarding screw connections and other rotatable and/or longitudinally movable parts against accidental loosening. The device includes a conical dish or plate spring which by means of the free end face of its inner and/or outer marginal zone rests against a counterthread on the carrier of the part to be safeguarded. The dish spring has a plurality of radially extending tongues, the ends of which, while not forming a thread, are merely so rounded that said tongues during the screwing-in operation will adapt themselves elastically to the thread of the carrier of the part to be safeguarded, and during the flattening of the spring will interwedge in the thread while causing no permanent deformations of the carrier thread.

3 Claims, 11 Drawing Figures

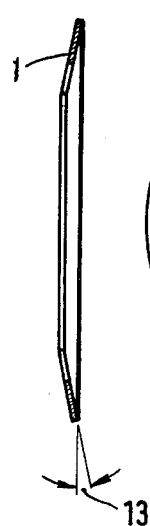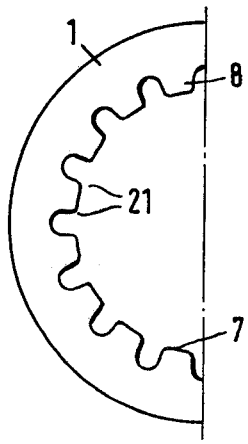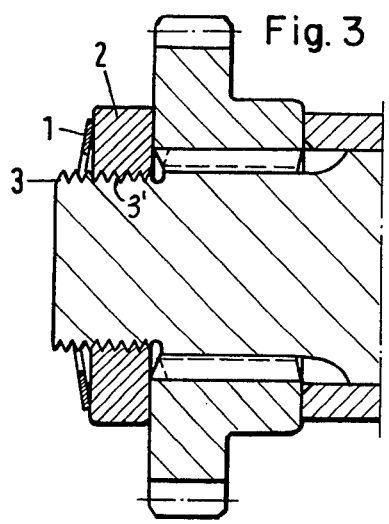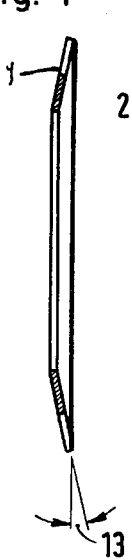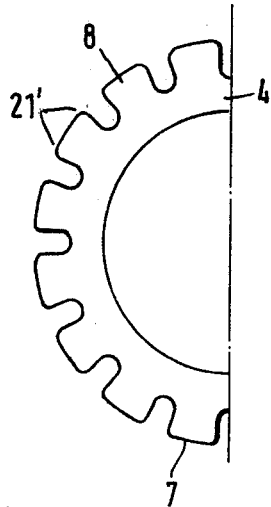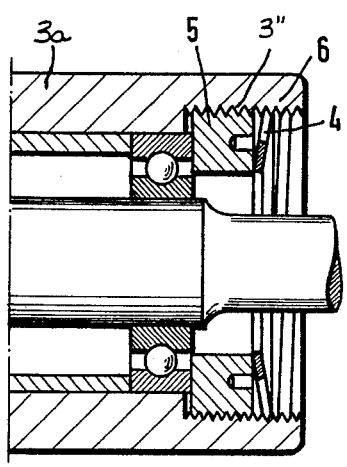

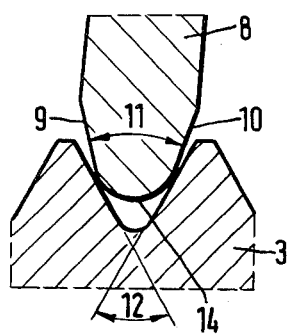
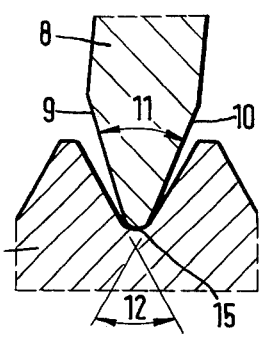
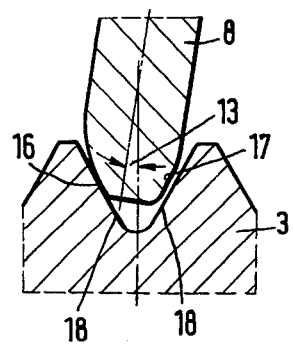
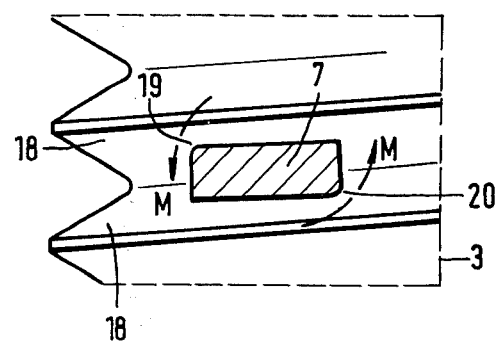
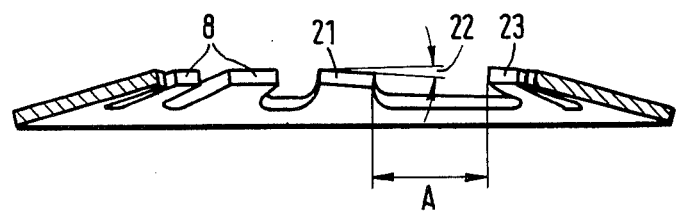

DEVICE FOR SAFEGUARDING SCREW CONNECTIONS AND OTHER MOVABLE PARTS AGAINST ACCIDENTAL LOOSENING

The present invention relates to a device for safeguarding screw connections and other rotatable and/or longitudinally movable parts against accidental loosening, and more specifically concerns devices of this type which comprise a conical dish or plate spring which by means of the free end face of its inner and/or outer marginal zone rests against a counterthread on the carrier of the part to be safeguarded.

A safety device of the above mentioned general type has been described in German Pat. No. 2,239,917 according to which, depending on whether the device is used on the inside or the outside, a marginal thread is cut into the device or imposed thereon. The shape of the flanks of this marginal thread is such that when screwing on and flattening the spring, a seizing with the counterthread is avoided. The safeguarding effect against accidental loosening of the part to be safeguarded is intended to be brought about by the dish spring, when being screwed on, engaging the part to be safeguarded and pressing the same. With a dish spring provided with inner thread, the inner diameter will in these circumstances decrease, and the dish spring thread wedges with the thread of the bolt. Inversely, with a dish spring equipped with an outer thread, during the pressing down, the outer diameter widens to such an extent that its female thread of the carrier wedges with the outer thread. This heretofore known arrangement has various drawbacks which will be further discussed with a dish spring having an outer diameter of 68mm and an inner diameter of 43mm. This dish spring if provided with inner threads fits on a bolt thread M 45 × 1.5, or if provided with outer thread fits into a female thread M 68 × 1.5. If the dish spring set forth as an example and provided with outer thread is pressed until it is plane, its outer diameter widens by from 0.25 to 0.30 mm. The tolerance of the flank diameter of the female thread, however, amounts along only to 0.125 mm (German Industrial Standards D.I.N. 13, associate sheet 15, quality degree fine). In connection therewith also the tolerance in the outer diameter of the spring (flank diameter) has to be taken into consideration which with an economical mass production must amount to at least 0.15 mm. Thus, the total of tolerances reaches only the size of the widening of the spring which means that a safe mutual wedging of dish spring with its outer thread in the female thread is not assured. Furthermore, the stresses have to be taken into consideration which occur when screwing on and interwedging the dish spring, which stresses result from the dimensions and the mounting height of the dish spring. Dimensions and mounting height are, however, determined by the practical instances of utilization.

An important individual case concerns the safeguarding of groove nuts (inner thread) and cross-hole nuts, etc. (outer thread). The diameter dimensions of such nuts should not be materially exceeded by the diameter dimensions of safety springs.

The required mounting angle is dependent on the tolerances which are to be bridged at lower pressures and should amount to at least 11°. The thickness of the spring plate is limited in downward direction by the thread pitch of the carrier thread, provided the thread crest or ridge of the spring plate is located on the thread flank and not on the thread bottom of the carrier thread. However, the last mentioned instance may be neglected in practice because the tolerance range (Gewindegrund) of the thread bottom is approximately three times as great as that of the flank diameter which again would endanger a safe engagement of the spring thread. The thickness of the spring plate in the selected example would have to be at least 0.8 mm which, however, as viewed from the stability of the plate of the size selected for the above mentioned example would be too thin.

With these assumptions concerning the ratio of inner diameter to outer diameter of the placement angle as well as of the minimum thickness and when taking into consideration the most favorable conditions for the stress to which the spring is subjected, the calculated pull stresses at the lower outer rim of the spring of the selected example will when screwing on and flattening the spring up to a point shortly prior to a plane condition, still amount to 180 kp/mm$^2$. Additional tangential pull stresses which correspondingly increase the above mentioned pull stresses would be superimposed upon said stresses during the interwedging of the plate, by the occurring spreading forces. The peak stresses within the region of the two holes which have to be provided for receiving the end face hole wrench (Stirnlochschlüssels) have not been taken into consideration. Thus, the flow limit of economic spring steels are far exceeded and this flow limit in hardening condition lies at approximately 110 kp/mm$^2$.

It is, therefore, an object of the present invention to provide a dish spring as a safety device which will overcome the above mentioned drawbacks and which can be economically mass produced.

These and other objects and advantages of the invention will appear more clearly from the following specification in connection with the accompanying drawings, in which:

FIG. 1 illustrates a cross section through an inwardly slotted safety spring according to the invention.

FIG. 2 illustrates a top view of half of the safety spring shown in FIG. 1.

FIG. 3 shows a correspondingly inwardly slotted safety spring.

FIGS. 4 and 5 illustrate similar to FIGS. 1 and 2 the design of the tongue tips of an outwardly slotted embodiment of the safety spring.

FIG. 6 is a viewsimilar to that of FIG. 3 with an outwardly slotted spring.

FIGS. 7, 8, 9 and 10 illustrate the design of the tongue tips in connection with an inner slotted dish spring according to FIG. 1.

FIG. 11 illustrates a cross section through a safety spring with an angled-off tongue.

The safety device for screw connections and their rotatable and longitudinally movable part against accidental loosening which safety devices comprise a conical dish spring which has the free end face side of its inner and/or outer marginal zone resting on a counterthread for the carrier for the part to be secured, is characterized primarily in that the dish spring has a plurality of radially extending slots, and that the ends of the thus formed tongues while avoiding a thread are merely so rounded that said tongues will during the screwing-in operation adapt themselves elastically to the thread of the carrier for the part to be secured and will during the flattening of the spring interwedge in said thread while avoiding permanent deformations of the carrier thread.

In view of the slotting of the dish spring, the critical tangential pull dimensions can be reduced to a permissible extent. The slots may be so designed that they serve for receiving an end face hole wrench normally utilized for screwing on.

The spring may be slotted inwardly (see FIG. 1) or outwardly (see FIG. 4) depending on whether the spring is to be screwed into a bolt thread or a female thread.

If the dish spring is screwed into a female thread, the outwardly slotted spring will in response to a pressing through of the dish spring spread open in order when taking into consideration the tolerances on both sides, a safe tensioning of the tongue ends in the female thread of the carrier will be assured.

Referring now to the drawings in detail, FIGS. 1, 2 and 3 show in different views the inner slotted safety spring 1 which is utilized when the carrier of the part to be secured has a bolt thread as shown in FIG. 3. In this instance, the safety spring 1 for securing the nut 2 is screwed onto a shaft thread 3.

FIGS. 4, 5 and 6 show a correspondingly outwardly slotted design of a safety spring 4 which is utilized with a carrier provided with a female thread as shown in FIG. 6. In this instance, the spring 4 secures a hole nut 5 with outer thread in a bore with inner thread 6.

FIGS. 7, 8, 9 and 10 show the design of the tongue tips in connection with an inner slotted dish spring according to FIG. 1.

More specifically, FIGS. 7, 8 and 9 show different forms of tongue tips 7 of the dish spring, in meshing engagement with the carrier thread 3. When screwing on the dish springs 1, the tongues 8 which are elastic in axial direction adapt themselves to the course of the carrier thread 3. When the dish spring 1 engages the part 2 to be secured, the said dish spring during a further unscrewing will begin to flatten. In connection therewith, its diameter begins to decrease between the tongue end 7, and these tongue ends 7 start to interwedge with the carrier thread 3.

In order to assure that the tongue ends during the screwing-on operation and during the flattening of the spring will not damage the carrier thread, they have to be designed accordingly. In FIGS. 7 and 8, the tongue ends were chamferred or beveled at the top side 9 and bottom side 10 in such a way that the common angle 11 of the chamfers is less than the flank angle 12 of the carrier thread. The magnitude of the chamfer angle 11 is determined by the angle of incidence or pitch angle 13 of the non-tensioned dish spring. Depending on the size of the rounding 14,15 of the tip formed by the chamfers 9 and 10, the tongue ends rest upon the flanks of the carrier thread (FIG. 7) or in the thread bottom (FIG. 8).

According to FIG. 9, the tongue ends have a different shape. In this instance, the upper edges 16 and the lower edges 17 of the tongue ends have radii which when the dish spring is flattened, permit a rolling of the edges of the flanks 18 of the carrier thread. The optimum radii can be geometrically ascertained for the individual instance, and usually the radius of the upper edge is about twice that of the lower edge.

FIG. 10 shows a cut tongue end 7 in engagement with the carrier thread 3. The thread flanks 18 twist the tongues 8 and through the edges 19 and 20 exert a torque M which torque can be influenced by the selection of the width, length and thickness of the tongues and which increases with increasing flattening of the dish spring. This torque M brings about an additional safety for the spring against accidental loosening of the thread connection.

The high surface pressures occurding at the edges 19 and 20 should be reduced by rounding of said edges in order to prevent damage to the thread flanks 18. For the same reason, also the corners 21' of the tongues 8 should be rounded as illustrated in FIGS. 2 and 5.

FIG. 11 shows a safety spring 1 in cross section with the tongue 21 angled in the direction of the pitch in order to facilitate the "threading" into the first thread winding of the carrier thread 3. The angle 22 need not considerably exceed the pitch angle of the carrier thread 3. When the spring 1 is screwed onto the carrier thread 3, the angled-off tongue 21 precedes the tongue 23 by one winding. The distance A between the tongues 21 and 23 may be larger than the distance between other adjacent tongues. In this way, the dish spring can better compensate for the jump between the tongues 21 and 23 at the level of the thread pitch.

It is, of course, to be understood that the present invention is, by no means, limited to the specific showing in the drawings, but also comprises any modifications within the scope of the appended claims.

What I claim is:

1. For use in connection with a member provided with a threaded section and with abutment means carried by said member and with a threaded element engaging said threaded section and to be held secured against said abutment means; a conical dish spring having an inner and an outer marginal zone, one of said marginal zones comprising in combination a plurality of radially extending tongues having free ends elastic in axial direction and lying on the conical surface of said dish spring and chamfered on both top and underside thereof, said sides of each tongue being inclined to the surface of said tongue to form an angle which is less than the flank angle formed by the sides of adjoining threads to penetrate deeply into the threaded element to increase self-binding action, the end of each tongue between said sides being rounded to form a curved nose on said tongue and the corners of the thread-engaging end of the tongue being rounded to avoid damage to the sides of the threads, and the other one of said marginal zones forming an engaging section of said dish spring for selective engagement with said threaded element, said dish spring being placeable on said member dually secured against unintended loosening with said tongues in elastically deformed condition being progressively flattened when engaging under pressure said threaded section and being twisted to form an angle with said conical surface by engagement with the sides of the adjoining threads, while simultaneously said other marginal zone under preload engages said threaded element and presses the same against said abutment means and while said tongues also elastically interwedge with said threaded section.

2. A dish spring according to claim 1, in which each of the free ends of said tongues has a inclined, curved first side and an inclined, curved oppositely located second side, and in which said first side has a considerably greater radius than said second side to permit said tongue ends to roll and rest on the thread flanks of the thread in connection with which said dish spring is to be used.

3. A dish spring according to claim 2, in which the radius of said first side is about twice the length of the radius of said second side.

* * * * *

UNITED STATES PATENT OFFICE
CERTIFICATE OF CORRECTION

Patent No. 4,139,038  Dated February 13, 1979

Inventor(s) Ingo Häussermann

It is certified that error appears in the above-identified patent and that said Letters Patent are hereby corrected as shown below:

[30]     Foreign Application Priority Data

March 6, 1976 [DE] Fed. Rep. of Germany..2609298

Signed and Sealed this

Tenth Day of July 1979

[SEAL]

Attest:

LUTRELLE F. PARKER
           Attesting Officer    Acting Commissioner of Patents and Trademarks